United States Patent [19]

Zauner

[11] 4,421,226

[45] Dec. 20, 1983

[54] ARTICLE RECEIVING AND DECELERATING DEVICE

[75] Inventor: Otto Zauner, Vineland, N.J.

[73] Assignee: Owens-Illinois, Inc., Toledo, Ohio

[21] Appl. No.: 248,669

[22] Filed: Mar. 30, 1981

[51] Int. Cl.³ .................................................. B05G 47/44
[52] U.S. Cl. ...................................... 198/534; 198/526; 193/40
[58] Field of Search ............... 198/526, 528, 534, 560, 198/578, 592, 631; 193/32, 40, 17, 20, 24; 53/248

[56] References Cited

U.S. PATENT DOCUMENTS

| | | | |
|---|---|---|---|
| 1,636,429 | 7/1927 | Olsen | 198/576 |
| 3,253,739 | 5/1966 | Martin | 198/526 X |
| 3,464,529 | 9/1969 | Hersky, Jr. | 193/32 X |
| 3,603,462 | 9/1971 | Moser | 198/631 X |
| 3,842,967 | 10/1974 | Davis | 198/526 |
| 4,215,521 | 8/1980 | Hartness | 53/248 |

Primary Examiner—John J. Love
Assistant Examiner—Paul A. Sobel
Attorney, Agent, or Firm—John R. Nelson; Myron E. Click

[57] ABSTRACT

Rapidly descending articles are decelerated in a segmented walled mechanism which alternately decreases in cross-sectional area to decelerate and restrain an article and subsequently increases in cross-sectional area to permit the article to fall safely to a reception device, such as a conveyor, below. The decrease in cross-sectional area is synchronized with the delivery of the article from an associated fabrication device. The mechanism also includes a synchronously oscillating receiving tube which alternately tracks one moving discharge site on the fabrication device and then returns to engage and track an adjacent discharge site. Orientation of the article is maintained as it passes through the cross-sectional area and onto the conveyor.

25 Claims, 5 Drawing Figures

ARTICLE RECEIVING AND DECELERATING DEVICE

BACKGROUND OF THE INVENTION

The invention relates generally to article receiving and delivery devices and more specifically to a synchronously actuated article receiving, decelerating and delivery device for utilization with fabrication means which discharge articles in synchronous intervals.

High volume machine production of unitary articles such as light bulbs, glass containers and other relatively delicate articles is a goal universally sought. Unfortunately, the high speeds at which modern automated fabrication machines function represent a significant hazard to the fabricated products. Some relief from this problem is enjoyed during the forming of such articles, while the temperature of the thermoplastic material from which they are fabricated is near its melting temperature. In this condition, the articles are nearly immune to damage associated with rough handling and high-speed transfer. As the material from which the article is formed cools, typically near completion of the fabrication process, insulating the article from impact and other fracture inducing handling becomes a major concern.

Generally speaking, fabrication of products of thermoplastic material is accomplished at a high rate of speed and the annealing process wherein such articles of manufacture gain their ultimate strength is a relatively slow process. Thus, prior to annealing, such articles are in a relatively delicate condition. Unfortunately, this delicate condition coincides precisely with the necessary step of transferring the article from the high speed forming and finishing equipment to the more slowly paced annealing equipment.

Various padded passageways and transfer arms are known in the prior art. One such device is disclosed in U.S. Pat. No. 4,122,934. The device therein disclosed utilizes selectively inflatable pneumatic chambers to control the rate of descent of bodies. Such a mechanism necessarily depends upon maintenance of the integrity of the pneumatic chambers in order to operate properly. In certain applications wherein the body passing through the device may even occasionally have jagged, abrasive edges, such chamber integrity may be difficult to ensure.

Loose, flexible chutes have also been suggested in the prior art. While apparently responding to such requirements as delicate handling of the article, deceleration of the article and directing its travel, such devices may not control orientation of the article. Thus, although articles may be discharged in uniform orientation from the fabrication device, such a flexible transfer means may allow the article to reorient itself and thus make subsequent handling and other production steps such as packaging difficult. Such a problem can, of course, be corrected by the addition of article sensing and reorienting equipment, but such equipment adds to the complexity, cost, and likelihood of malfunction of the equipment.

SUMMARY OF THE INVENTION

The instant invention comprehends an article receiving, decelerating and delivery device which maintains proper orientation of the article during its passage through the device. The device comprises an oscillating receiving tube which is synchronously moved in relationship to the discharge sites of a rotating or otherwise moving fabrication device. The receiving tube alternately tracks one moving discharge site, receives an article therefrom during the discharge cycle of the process and then returns to engage and track an adjacent discharge site during its discharge cycle. The receiving tube discharges the article into a plural walled chamber. The walls of the chamber are moveable such that the cross-sectional area thereof may be decreased to decelerate and restrain an article and subsequently increased to permit the article to fall safely to a receiving device, such as a conveyor, a short distance below. The chamber may be defined by a plurality of pivoted, vertically oriented walls, which are driven inwardly toward and outwardly away from the article receiving chamber by suitable drive means. The decrease and increase in cross-sectional area of the chamber is synchronized with the delivery of the article from the oscillating receiving tube. Depending upon the delicacy of the articles passing through the device, the inner faces of the pivoted walls may be covered by material exhibiting appropriate stiffness or resiliency.

Thus, it is an object of the instant invention to provide a device which receives fabricated articles, decelerates them, and delivers them to an associated transfer means.

It is a further object of the instant invention to provide a device which receives articles from moving discharge sites on a fabrication machine and delivers them to a stationary article conveying device.

It is a still further object of the instant invention to provide an article deceleration and delivery mechanism which is both simple in construction and operation.

Further objects and advantages of the instant invention will become apparent by reference of the following description and appended drawings.

DESCRIPTION OF THE PREFERRED EMBODIMENT

Figure 1:
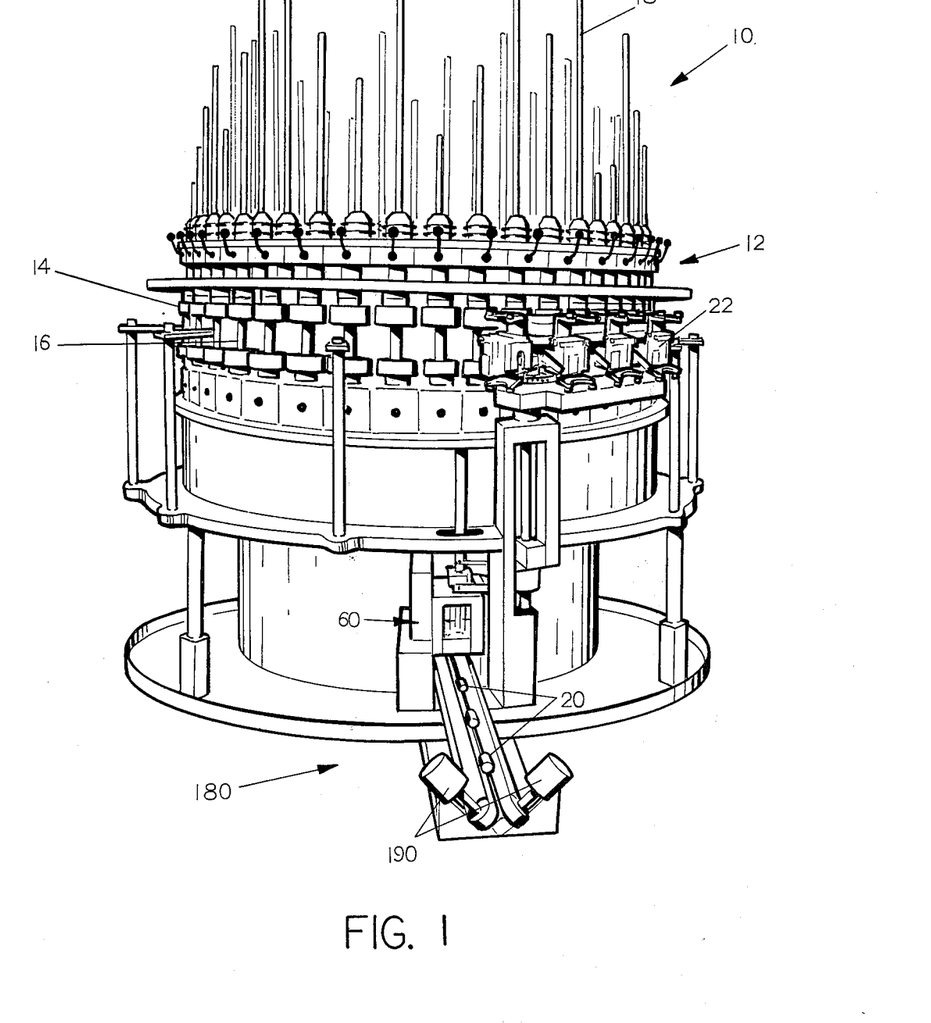
FIG. 1 is a perspective view of a production machine incorporating therein an article receiving and decelerating device according to the instant invention.

Referring now to FIG. 1, an article fabricating machine incorporating the instant article decelerating and delivery device is generally designated by the reference numeral 10. For purposes of illustration and example only, the instant invention will be described in relationship to the machine 10 which is a vertical glass vial machine. However, it should be understood that the invention is wholly appropriate for use with similar fabrication machines and in similar applications wherein an article must be captured, decelerated and delivered.

The glass vial machine 10 is a carousel-like machine having a plurality of fixtures 12 which are disposed about its periphery and revolve about the central vertical axis of the machine 10. Each of the fixtures 12 includes an upper and lower chuck assembly 14 and 16, respectively. Each of the upper chuck assemblies 14 and lower chuck assemblies 16 are driven in synchronism and each may be independently opened and closed, for example, to advance fresh stock such as glass tubes 18 into the upper chuck assemblies 14 and to release the completed article such as glass vials 20 from the lower chuck assemblies 16. The glass vial machine 10 includes various heating, separating, and sealing means which transform the glass tubes 18 into glass vials 20. These means also include tooling stations 22 which tool the finish of the glass vial 20, but which form no portion of the instant invention.

Figure 2:
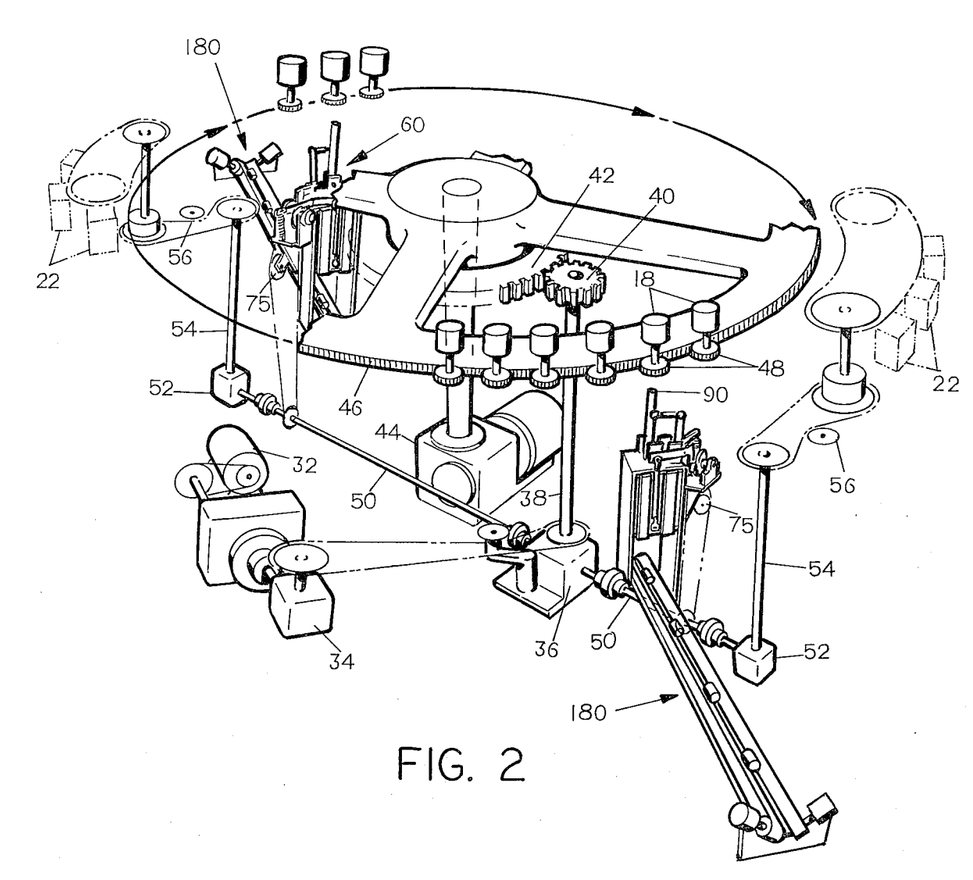
FIG. 2 is a diagrammatic view of the drive means of a production machine incorporating the instant invention.

Referring now to FIGS. 1 and 2, the vial machine 10 preferably includes a drive assembly 30 having an electric motor 32 and suitable speed reduction and power direction means 34 and 36, respectively. The power direction means 36 disposed centrally within the machine 10 includes a vertically oriented output shaft 38 having a pinion gear 40 which drives a spur gear 42. The spur gear 42 is secured to the fixtures 12 of the vial machine 10 and thus revolves the fixtures 12 about the central vertical axis of the machine 10. A variable speed drive assembly 44 drives a pair of spur gears 46 (only one of which is illustrated in FIG. 2) which engage a plurality of pinion gears 48 secured to a respective one of the rotating upper and lower chuck assemblies 14 and 16. Thus, as the fixtures 12 revolve, the chuck assemblies 14 and 16 are driven in synchronism at variable speeds by the drive assembly 44.

Horizontal shafts 50 extend radially outwardly from the power direction means 36 and drive the tooling station assemblies 22 through suitable right angle drive means 52, shafts 54 and chain drive assemblies 56. The biradial drive from the power distribution means 36 is necessitated by the fact that the vial machine 10, although requiring substantially one full revolution of the fixtures 12 to produce a completed article such as the glass vial 20, is simultaneously fabricating vial finishes in two regions and vial bottoms in two generally vertically aligned regions disposed on opposed halves of the machine 10. Therefore, two assemblies of tooling stations 22, as well as substantially all other assemblies are utilized in diametrically opposed pairs in the instant example.

One such additional assembly utilized in pairs is the instant invention, an article receiving and decelerating assembly 60. As just discussed, since the vial machine 10 produces an article in 360° of rotation, but includes mechanisms in diametrically opposed pairs which perform the same operations on similarly diametrically opposed pairs of glass vials 20, two receiving and decelerating assemblies 60 are utilized in diametric opposition on the vial machine 10. It should be understood, however that the assembly 60 may be utilized as necessary, e.g., singly, in accordance with the requirements of article discharge and delivery of any given fabrication machine.

Figure 3:
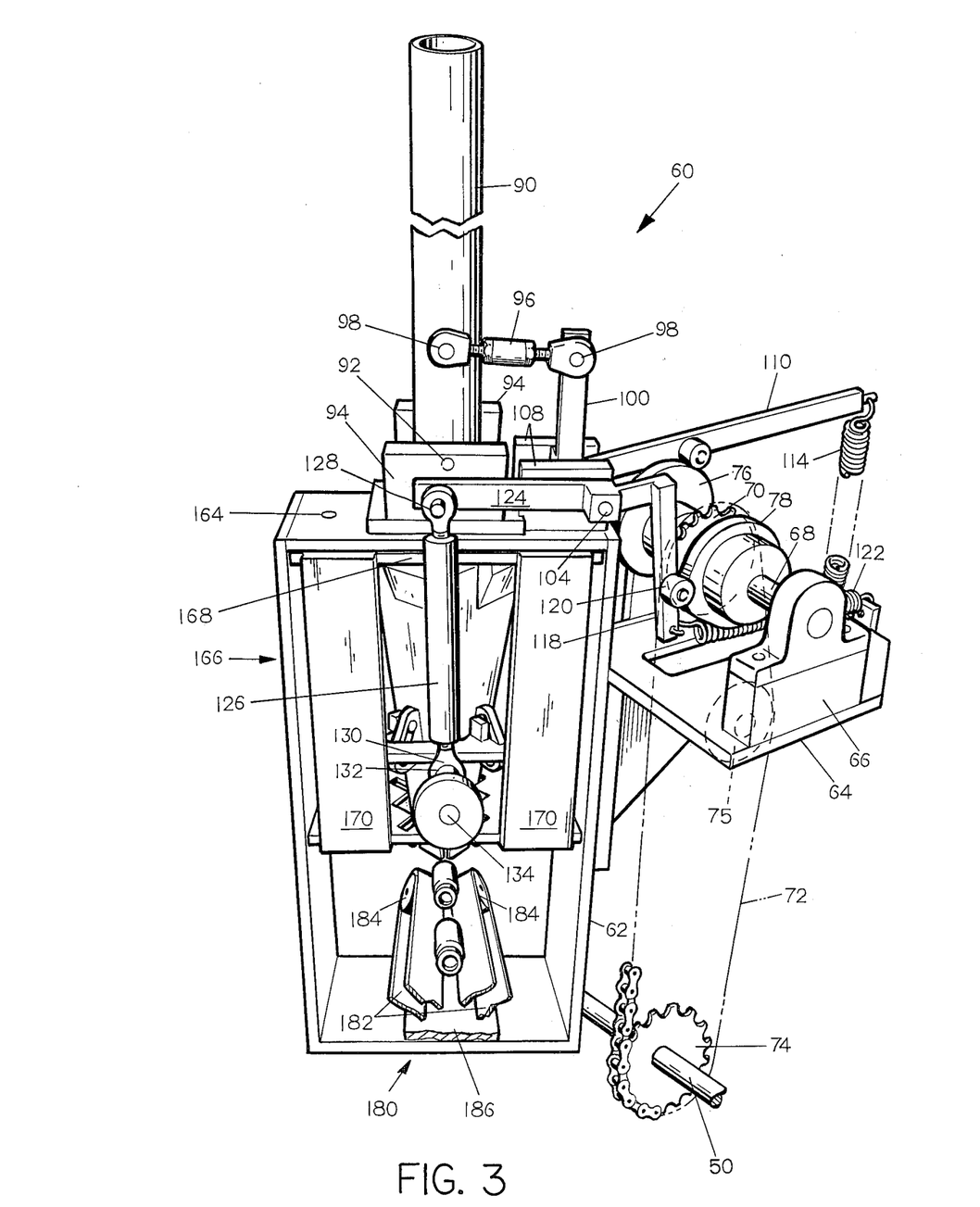
FIG. 3 is a perspective view of an article receiving and decelerating device according to the instant invention.

Referring now to FIGS. 2 and 3, the article receiving and deceleration assembly 60 includes a generally rectangular frame 62 having a generally planar support member 64 secured to one side. A pair of journal bearings 66 disposed upon the support member 64 rotatably mount a stub shaft 68. Centrally disposed upon the stub shaft 68 is a chain sprocket 70 over which a chain 72 is disposed. The chain 72 is driven by a sprocket 74 secured to the horizontal shaft 50 disposed between the power direction means 36 and the right angle drive 52. Preferably, an adjustable idler sprocket 75 also engages the chain 72 and provides proper tensioning thereof. A rear cam 76 and a front cam 78 are both secured to the stub shaft 68 and driven by the chain 72.

Figure 4:
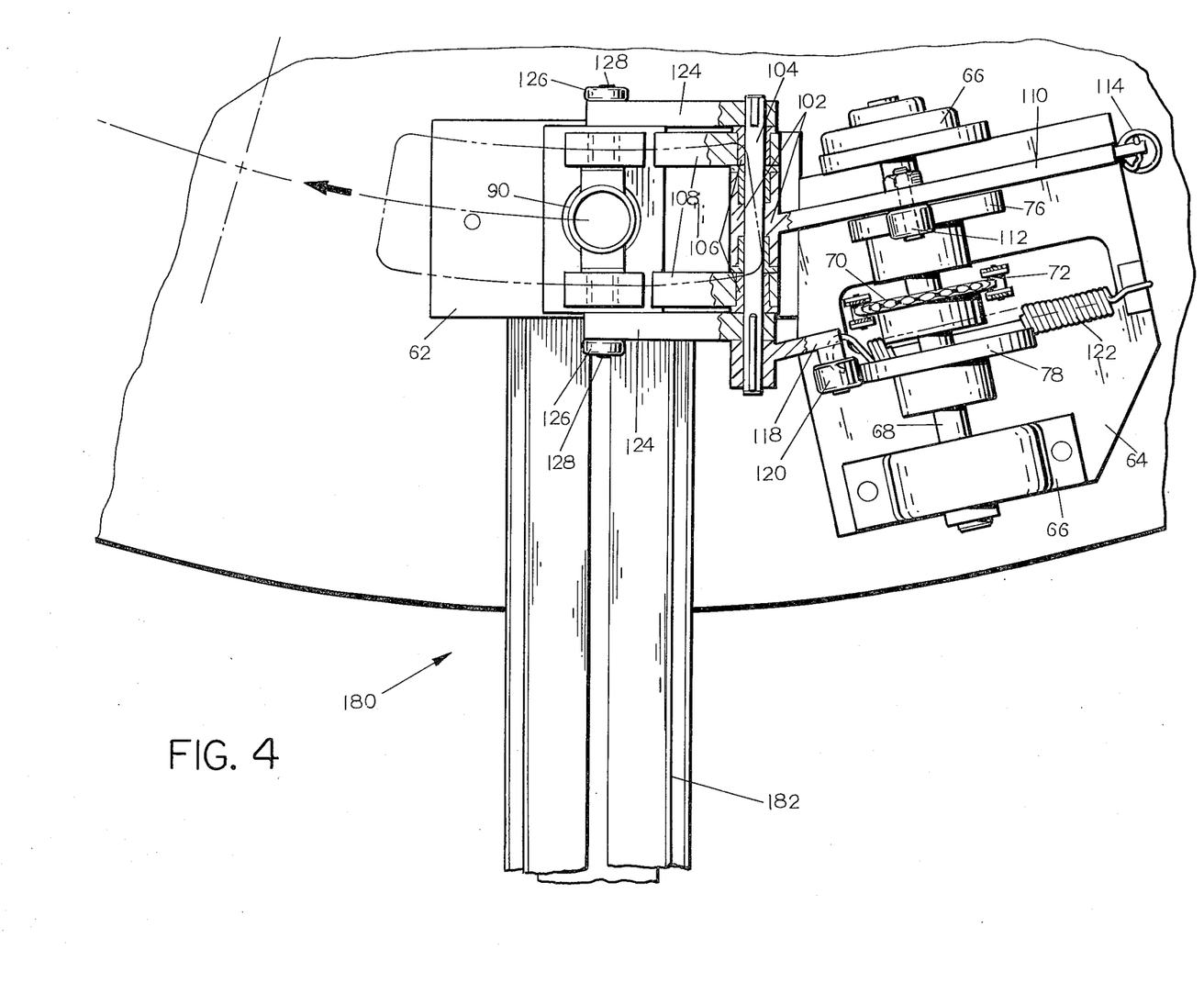
FIG. 4 is a top-plan view of an article receiving and decelerating device according to the instant invention.
Figure 5:
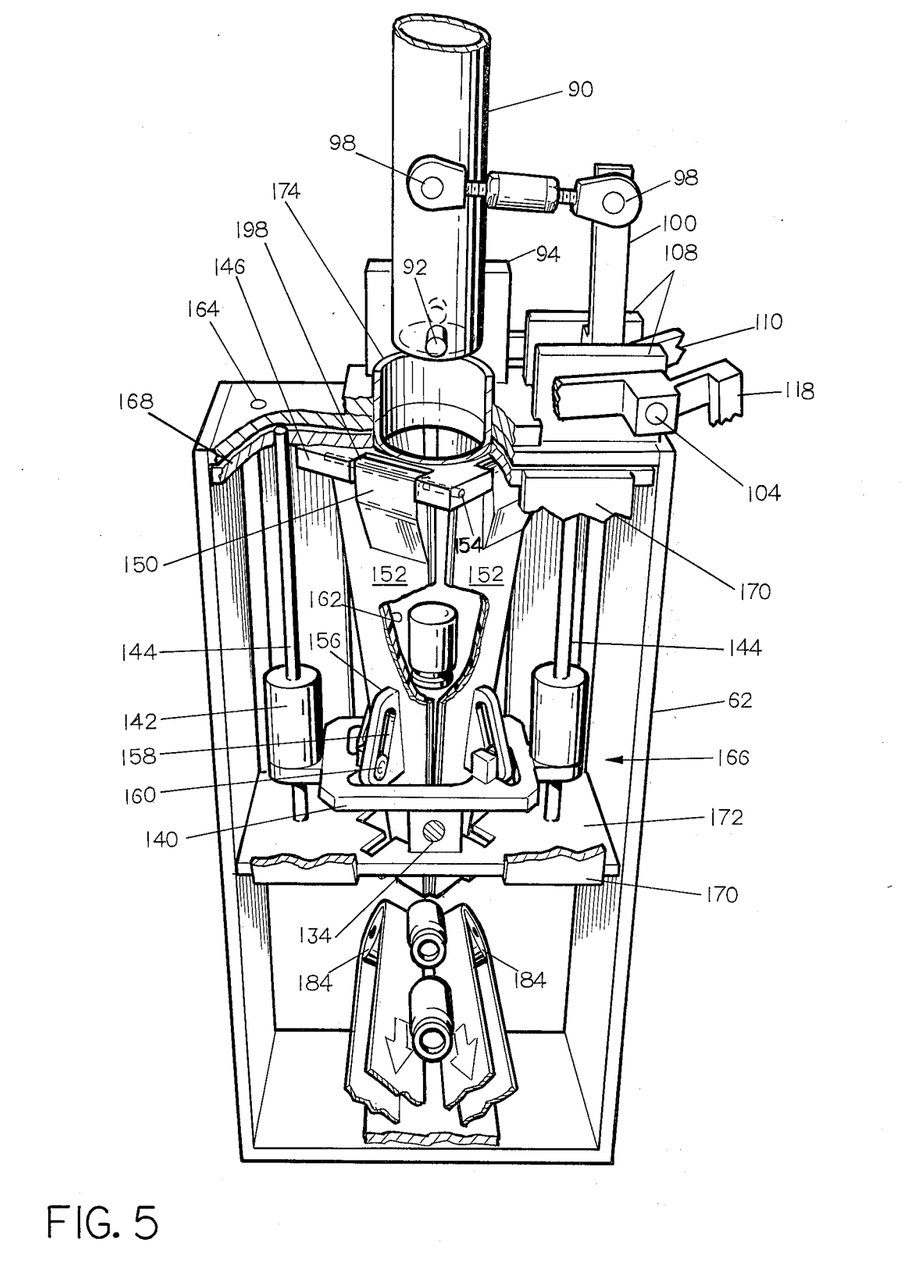
FIG. 5 is a fragmentary perspective view with broken away portions of an article receiving and decelerating device according to the instant invention.

Referring now to FIGS. 3, 4 and 5, the cam 76 which is disposed to the rear of the assembly 60 as viewed in FIG. 3, controls the oscillatory movement of an article receiving tube 90.

The receiving tube 90 extends upwardly into proximity with the lower portion of the lower chuck assemblies 18. Adjacent the lower margin of the article receiving tube 90, a pair of pins 92 pivotally secure it to a pair of vertically extending brackets 94 secured to the frame 62. Proximate the lower margin of the tube 90, a turnbuckle 96 is pivotally secured thereto by a pivot pin 98. The opposite end of the turnbuckle is similarly secured to a vertically disposed arm 100. The arm 100 extends from a collar 102 which is freely rotatably mounted upon a pivot shaft 104. The shaft 104 is supported within bushings 106 in a pair of vertically extending support brackets 108. Also secured to the collar 102 and disposed at substantially a right angle to the arm 100 is a lever arm 110. A cam follower 112 is rotatably secured to the lever arm 110 and a tension spring 114 maintains intimate contact between the surface of the rear cam 76 and the cam follower 112. Rotation of the rear cam 76 thus causes vertical movement of the cam follower 112 which is transferred to the arms 110 and 100 and to the article receiving tube 90 causing pivotal oscillation thereof.

A second lever arm 118 likewise includes a cam follower 120 rotatably secured thereto which engages the surface of the front cam 78. A tension spring 122 maintains the cam follower 120 in intimate contact with the surface of the front cam 78. The second lever arm 118 is fixedly secured to the pivot shaft 104 as are a pair of horizontally extending arms 124. Rotation of the front cam 78 thus causes the lever arm 118 to pivot about the axis of the shaft 104 and the pair of arms 12 to pivot correspondingly. Adjacent the terminus of each arm 124 opposite the pivot shaft 104 is secured a respective pair of adjustable links 126. A pair of pivot pins 128 provide suitable connection between the respective adjustable links 126 and the arms 124. Each of the adjustable links 126 preferably includes one threaded adjustment means 130 to permit adjustment of the axial length of the link 126. The ends of the adjustable links 126 opposite the lever arms 124 preferably define a ball and socket connection 132 through which a securement pin 134 may be selectively inserted or removed.

Referring now to FIG. 5, the pairs of securement pins 134 associated with the adjustable links 126 attach to a square collar 140. The collar is secured to a pair of linear bearing assemblies 142. The linear bearing assemblies 142 are, in turn, mounted upon a pair of vertically disposed rods 144. The collar 140 is thus constrained to vertical translation along an axis parallel to the axes of the vertically oriented rods 144.

A mounting plate 146 is disposed adjacent the upper portion of the frame 62 and includes a plurality of reentrant regions or notches 198 disposed therein. The notches 148 cooperate wih an equal plurality of lugs 150 to pivotally secure a like plurality of depending wall sections 152. The lugs 150 and wall sections 152 are preferably secured to the plate 146 by a like plurality of drive pins 154 disposed within suitably sized openings within the mounting plate 146 and the lugs 150. The mounting plate 146 illustrated is square and has one wall section 152 depending from each side. While utilization of four of the wall sections 152 has been found to provide an optimum balance between performance, cost and complexity, it should be understood that variations in the number of wall sections 152 may prove beneficial in certain applications and such variations in both anticipated and deemed to be within the scope of the instant invention.

The wall sections 152 extend downwardly through the opening defined by the collar 140. Each of the wall sections 152 includes a perpendicularly oriented ear 156 having an obliquely oriented through slot 158 formed therein. Slidingly disposed within each of the slots 158 associated with each of the wall sections 152 is a pin 160 which is secured to the collar 140 for vertical translation therewith. The inner surfaces of the wall sections 152 are preferably covered with a material 162 having appropriate resiliency and durability for the articles passing through the device 60. For example, it has been found that if the material 162 is Kelvar, a synthetic material manufactured by E. I. duPont deNemours Company, it provides appropriate cushioning and durability for use with glass vials 20.

Referring now briefly to FIGS. 3 and 5, certain construction details of the article receiving and decelerating assembly 60 will be noted. Secured to the upper portion of the frame 62 by suitable fasteners 164 is a subframe 166. The subframe 166 comprises an upper horizontal plate 168 to which the fasteners 164 and mounting plate 146 are secured, pairs of vertically extending plates 170 and a lower horizontal plate 172. The subframe 166 including the mounting plate 146, the plural wall sections 152 and associated components may thus be removed as a unit from the frame 62 for service and adjustment. As illustrated in FIG. 5, the mounting plate 146 also includes an upwardly extending circular collar 174, which transfers the articles from the receiving tube 90 into the volume defined by the wall sections 152 and maintains the orientation of the article such as the glass vial 20. It should be apparent that both the cross-section of the tube 90 and that of the collar 174 may be modified to conform to the particular cross-section of the articles which are intended to pass through the article receiving and decelerating assembly 60.

Finally, referring to FIGS. 1 and 3, a conveyor assembly 180 is utilized to receive the glass vials 20 from the article receiving and decelerating assembly 60 and move them away from the vial machine 10. The conveyor assembly 180 preferably includes a pair of flexible belts 182 oriented at right angle to one another although a single belt and appropriate stationary guides may be used. The belts 182 are disposed upon rollers 184 which are rotatably secured to a suitable support structure 186. At the opposite end of the conveyor assembly 180 are disposed a pair of drive rollers 188 and a pair of drive motors 190. In a conventional manner, the conveyor assembly 180 thus receives articles from the article receiving and decelerating assembly 60 and moves them outwardly from the machine 10.

Operation of the article receiving and delivery assembly 60 is most clearly understood with reference to FIGS. 2 and 3. It should be apparent from FIG. 2 that drive to the article receiving and decelerating assembly 60 and to the fixtures 12 is common and that with appropriate drive ratios, cam rotation and fixture translation is related. In this instance, the shaft 68 should rotate one revolution as the machine carousel revolves through an angle equal to the separation between adjacent fixtures 12. As has been previously explained, rotation of the rear cam 76 causes oscillation of the receiving tube 90 such that it alternately tracks a lower chuck assembly 18 during its discharge cycle and returns to engage and track a subsequent lower chuck assembly 18 during its discharge cycle. Two adjustments to the components associated with the receiving tube 90 assure proper operation. First, the cam 76 may be rotated relative to the shaft 68 and then fixedly secured by suitable means (not illustrated) to adjust the phase of oscillation of the receiving tube 90 relative to the circular translation of the lower chuck assemblies 18. Further, the axial length of the turnbuckle 96 may be adjusted to fix the locations of commencement and termination of the oscillation of the receiving tube 90.

The alternate contraction and expansion of the wall section 152 is accomplished by cooperation between the pins 160 which are mounted upon the vertically reciprocating collar 140 and slidably disposed within the oblique slots 158 in the ears 156. While it is apparent that the general size of the wall sections 152 and overall assembly 60 must be related in a general fashion to the size of the articles passing therethrough, the adjustable link 126 permits a certain range of adjustment of the radial travel of the wall sections 152. Likewise, the rise and fall of the cam 78 may be adjusted to control the excursion of the wall sections 152. With delicate articles such as the glass vials 20, it has been found especially advantageous to adjust the contraction of the wall sections 152 such that contact is made only with the shoulders thereof such as illustrated in FIG. 5. Such contact minimizes the possibility of damage to the finish of the glass vial 20. Subsequent to the arrest of the vertical travel of the glass vial 20 or other article, the wall sections 152 expand and allow the article to drop to the conveyor belts 182 below. The profile of the cam 78 is chosen such that the collapse of the wall sections 152 is relatively rapid, whereas the expansion is relatively slow. Such profile choice is possible since the wall sections collapse while no article is present within the chamber defined thereby and it is advantageous for the wall sections 152 to expand slowly to allow the article such as the glass vial 20 to exit the assembly 60 as gently as possible. Finally, it should be noted the orientation of the articles such as the glass vials 20 is maintained through the entire transfer process from the lower chuck assemblies 18 onto the belt 182 of the conveyor assembly 180. Orientation maintenance through the receiving tube 90 and into the chamber defined by the wall sections 152 has been previously described. As the article such as the glass vial 20 exits the chamber defined by the wall sections 152 the finish of the glass vial 20 contacts the moving conveyor belts 182. The conveyor belts 182 translate at a speed which is sufficiently rapid to trip or kick the glass vial 20 onto its side into the orientation illustrated in FIG. 3. Thus, the glass vials 20 or other fabricated articles exit the machine 10 in uniform orientation.

The foregoing disclosure is the best mode devised by the plural inventors for practicing this invention. It is apparent, however, that devices incorporating modifications and variations to the instant invention will be obvious to one skilled in the art of fabricating machines. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A device for receiving and decelerating articles discharged from moving sites on a machine, comprising, in combination, means for receiving such articles from such moving sites including a receiving tube having a first end and a second end, said first end including means for pivotally supporting said receiving tube, a plurality of moveable wall segments defining an article receiving chamber, the first end of the receiving tube being located below the moving sites and the second end being located above and adjacent to the chamber, collar means disposed about said wall segments and located near the lower half of wall segments, the collar means being so constructed and arranged that the collar means reciprocates generally vertically to urge said wall segments toward one another to collapse the chamber to thereby decelerate the article and maintain its orientation and to urge the wall segments away from each other to expand the chamber, and drive means for oscillating said receiving means and for translating said collar means disposed about said wall segments to urge said wall segments toward and away from each other.

2. The device of claim 2 wherein said drive means for oscillating said receiving means includes a cam and a cam follower assembly mechanically coupled to said receiving tube.

3. The device of claim 1 wherein said drive means for translating said means disposed about said wall segments includes a collar disposed about said wall segments, means for translating said collar and means for coupling at least one of said wall segments to said collar.

4. The device of claim 3 wherein said drive means further includes a cam and follower assembly mechanically coupled to said collar.

5. The device of claim 1 wherein said drive means includes a first cam and follower assembly mechanically coupled to said receiving means and a second cam and follower assembly mechanically coupled to said means disposed about said wall segments and further including common means for driving said first and said second cams.

6. The device of claim 1 further including a mechanical drive to such machine having moving discharge sites and wherein said mechanical drive drives said drive means.

7. A device for receiving articles from moving discharge sites on a machine, decelerating such articles and delivering such articles comprising, in combination, a hollow receiving tube having an upper end and a lower end, said lower end including means for pivotally supporting said receiving tube, a plurality of moveable wall segments defining an article receiving chamber, the first end of the receiving tube being located below the moving sites and the second end being located above and adjacent to the chamber, collar means disposed about said wall segments for urging said wall segments toward and away from one another and expanding and collapsing said chamber, and a drive assembly including a first cam and follower means for pivoting said hollow receiving tube and a second cam and follower means for translating said collar means.

8. The device of claim 7 wherein said wall segments are secured by and depend from a respective pivot pin.

9. The device of claim 8 wherein each of said plurality of wall segments includes an oblique slot and said collar means includes a like plurality of slot engaging pins whereby translation of said collar means and pins pivots said wall segments.

10. The device of claim 7 wherein such article is a glass vial and such glass vial contacts said moveable wall segments only on the shoulders and walls of such vial.

11. The device of claim 7 wherein said collar means is disposed for vertical translation along a pair of substantially parallel guides and said guides, said collar means and said wall segments are disposed in a subframe unit.

12. The device of claim 7 wherein such machine includes a mechanical drive and such mechanical drive drives said drive assembly.

13. The device of claim 7 further including a conveyor means disposed generally below said chamber of said device for receiving articles therefrom.

14. The device of claim 7 or claim 12 wherein said first and said second cam are disposed upon a common shaft.

15. The device of claim 7 wherein each of said movable wall segments include a facing material.

16. The device of claim 15 wherein there are four wall segments.

17. A method of receiving and decelerating articles discharged from moving sites on a machine comprising the steps of:
oscillating an article receiving chute to alternately follow one of said moving sites during discharge of an article therefrom and return prior to following another one of said moving sites,
providing a collapsible chamber defined by at least two pivoted walls for alternately engaging and releasing said article and collar means disposed about the pivoted walls of the chamber,
moving the discharged article from the chute to the chamber,
reciprocating the collar means generally vertically about the pivoted walls and pivoting the walls to collapse and expand the chamber, and
synchronously oscillating said chute and pivoting said walls to collapse and expand said chamber to decelerate each of the articles and controlably release each of the articles.

18. The method of claim 17 including the step of oscillating the chute once for every collapse of said chamber.

19. The method of claim 17 further including the step of conveying said articles away from said chamber after having been released therefrom.

20. The method of claim 17 further including the step of providing facing material between said article and said collapsible chamber.

21. The method of claim 17 including the step of discharging said articles from said chamber in a uniform orientation.

22. A method of receiving and decelerating articles discharged from plural moving sites on a machine comprising the steps of:
providing a pivoted article receiving chute,
oscillating such chute to alternately follow one of said moving sites and return preparatory to follow another of said moving sites,
providing a chamber defined by collapsible walls and collar means disposed about the walls and adapted to reciprocate vertically about the walls to engage and release each of said articles to decelerate and controllably release each of said articles from the chamber, reciprocating the collar means vertically about the collapsible walls to urge the walls toward and away from each other to collapse and expand the chamber, moving each of the discharged articles from the chute to the chamber, and oscillating said chute in timed relationship to said moving sites and collapsing said walls in timed relation to the oscillation of said chute.

23. The method of claim 22, further including the step of individually discharging said articles from said chamber in uniform orientation.

24. The method of claim 22, further including the step of cushioning contact of said articles with said collapsible walls of said chamber.

25. The method of claim 22 wherein said chute oscillation and said chamber collapse are synchronous.

* * * * *